June 8, 1948.     R. E. WALTAMATH     2,443,061

FISH LURE AND LINE RETRIEVER

Filed March 4, 1946

INVENTOR.
R. E. Waltamath
BY
ATTYS

Patented June 8, 1948

2,443,061

UNITED STATES PATENT OFFICE 2,443,061

FISH LURE AND LINE RETRIEVER

Raymond E. Waltamath, Lodi, Calif.

Application March 4, 1946, Serial No. 651,868

2 Claims. (Cl. 43—30)

This invention relates to the fisherman's art; the object of the invention being to provide a simple and inexpensive retrieving unit, through the medium of which fish lines and the hooks and lures thereon may be retrieved after they have become snagged at the bottom of the water.

This object is accomplished by means of such structure and relative arrangement of parts as will fully appear by a perusal of the following specification and claims.

Figure 1:
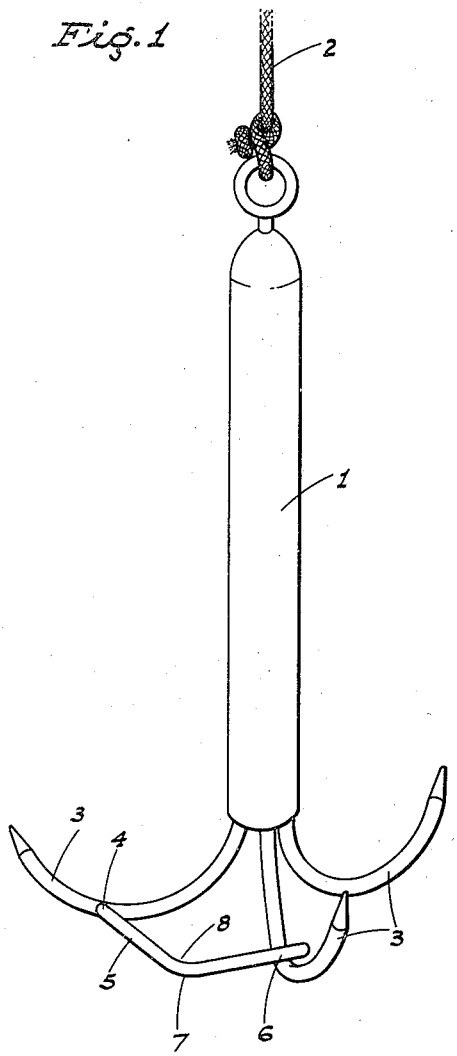
Fig. 1 is a side elevation of the improved retrieving unit.
Figure 2:
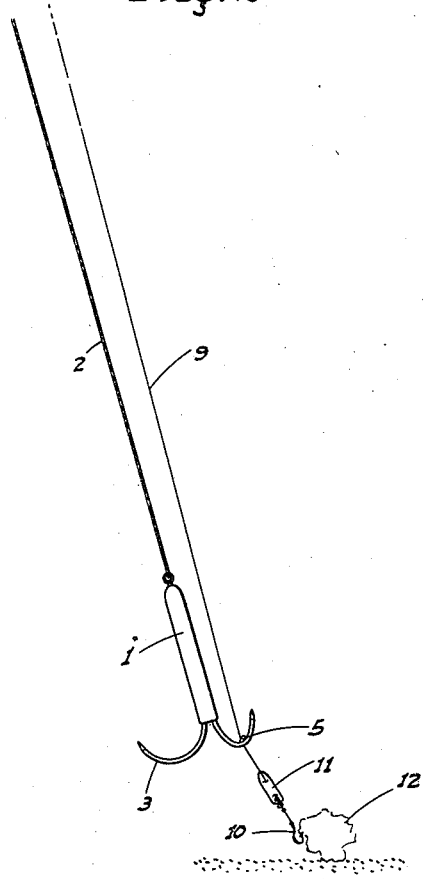
Fig. 2 is a view of the retrieving unit as it appears when in use.
Figure 3:
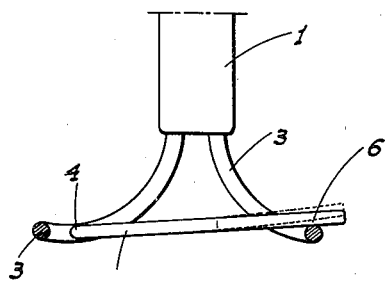
Fig. 3 is a fragmentary view of the end of the unit showing a spring finger projecting between two of the grapple hooks on the retrieving unit, and forming an enclosure guide for guiding the unit along a fish line to the location of the snagged hook and lure underneath the water.

Referring now more particularly to the characters of reference on the drawings, the numeral 1 designates a solid member of substantial weight, which may be preferably in the cylindrical form shown, but I do not wish to be understood as being limited to any specific configuration thereof.

This weight is attached to a cord or cable 2 of substantial strength, and which will be of a length sufficient to allow the retrieving unit to be dropped to the bottom of the water in which the hook is snagged.

At the bottom of the weight 1 are a plurality of outwardly flaring grapple hooks 3. Fixed to one of these grapple hooks, as at 4, is a spring finger 5, which extends from the one grapple hook across to a second grapple hook, against which it yieldingly presses, as at 6. The spring finger 5 has an outward bend, as at 7, forming an inner slideway 8 between the hooks across from which the spring finger extends.

When a fish line 9, with its hook 10 and its lure 11, becomes snagged at the bottom of the water, as on a log 12, the retrieving unit is put into play in the following manner.

The spring finger 5 is lifted from its frictional engagement with the adjacent hook 3 so that the line 9 may be slipped into the area encompassed by the two hooks 3 and the cross finger 5. Then the unit is dropped into the water and allowed to descend to the bottom thereof; the line 9 sliding along the curved guide 8 so as to properly guide the unit to the bottom of the water. When this is reached the grapple hooks 3 are adjacent the hook and lure which is snagged. Then by intermittently lifting and dropping the retriever element against the lure or hooks the latter may eventually be loosened from the object 12 on which they are caught. On the other hand by allowing plenty of slack in the line 9, the grapple hooks 3 may be engaged with the object 12 which may then be lifted to the surface of the water. Thus it will be seen that the retriever element may be made to function to either knock the hooks loose from the object 12 or to bring it to the surface of the water whereupon the hooks may be disengaged therefrom.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as set forth herein.

Having thus described the invention, the following is claimed as new and useful and upon which Letters Patent are desired:

1. A fish lure retriever comprising a weight, a flexible cable to the end of which the weight is attached, a plurality of grapple hooks flaring outwardly from the bottom of the weight, and a spring finger fixed to one hook and extending across to another hook and engaging the latter in yielding relation, the finger and the two hooks between which the finger extends defining a guide slot for the reception of a fish line.

2. A device as in claim 1 in which the finger is provided with an outward bend through which the fish line may be guided.

RAYMOND E. WALTAMATH.

REFERENCES CITED

The following references are of record in the file of this patent:

UNITED STATES PATENTS

| Number | Name | Date |
| --- | --- | --- |
| 2,210,271 | Thwaits | Aug. 6, 1940 |